United States Patent [19]
Scharenberg, Jr.

[11] 3,983,629
[45] Oct. 5, 1976

[54] PRECISION DIGITIZER APPARATUS

[75] Inventor: William F. Scharenberg, Jr., Columbus, Ohio

[73] Assignee: Battelle Development Corporation, Columbus, Ohio

[22] Filed: May 1, 1975

[21] Appl. No.: 573,800

[52] U.S. Cl. .................................. 33/1 M; 33/189
[51] Int. Cl.² .......................................... G01D 7/10
[58] Field of Search ............................ 33/1 M, 189

[56] References Cited
UNITED STATES PATENTS

| | | | |
|---|---|---|---|
| 3,024,696 | 3/1962 | Bomzer | 33/1 M X |
| 3,293,651 | 12/1966 | Gerber et al. | 33/1 M |
| 3,449,754 | 6/1969 | Stutz | 33/1 M X |

Primary Examiner—William D. Martin, Jr.
Attorney, Agent, or Firm—Philip M. Dunson; Charles F. Schill; Sidney W. Millard

[57] ABSTRACT

A digitizer comprising electromechanical and optical components arranged to provide a precision metrology aid for sensing, displaying, recording, and ultimately "playing back" the coordinate values of selected features or locations of all or parts of two dimensional contours taken from drawings, pictures, and other two dimensional media. Data pertaining to a third dimension may also be entered into the digitizer. Precision is achieved from a combination of factors including the inherent rigidness of the structure, built-in mechanical force control, and the inclusion of apparatus for the elimination of input vantage point parallax.

1 Claim, 4 Drawing Figures

PRECISION DIGITIZER APPARATUS

BACKGROUND OF THE INVENTION

This invention relates generally to automated graphical input/output devices and more particularly to a precision digitizer in an automated artwork system.

The electronics industry has experienced a tremendous revolution through the innovations now permitted by integrated and printed circuits and transistorized systems. Many of the present electronic integrated and printed circuits are very small and even "miniature" as final products.

The production of these miniature electronic circuits requires several steps in transposing them from the engineered and designed circuit to the production equipment circuit.

Automated artwork systems, such as the system described in Norton, U.S. Pat. No. 3,601,590, have become increasingly important and useful in permitting the precise drafting required to perform the above stated transposing of miniature circuitry designs to and from various forms of two dimensional media. These systems generally feature interactive computer graphics facilities through which the modification, testing, and even redesign of input circuitry is made possible. Along with Norton the patent to Hart, et al, U.S. Pat. No. 3,534,396, is of interest, since it teaches an interactive computer graphic system for design analysis.

Drafting tables, such as those set out in the Norton patent, generally possess the characteristic that, in conjunction with a digital computer, each of the selected points along a subject contour is assigned a digital value in both the X and Y-axes of an arbitrary two dimensional coordinate system superimposed on the working surface of the drafting table. Automated drafting tables possessing the above stated characteristics are hereinafter referred to as "digitizers."

Prior digitizers suffer from several severe limitations affecting precision. It is to solving these limitations of prior digitizers that the invention is directed.

In particular, the usual construction for prior digitizers employs a cantilever arrangement, such as shown in FIG. 1 of the Norton Patent, wherein a Y-axis arm, including moveable cursor, is mounted at right angles to and upon a single X-axis rail. The cantilevered construction as shown is mechanically unstable in that the digitizer lacks rigidity. As a result, input accuracy may be adversely affected by small factors such as the weight of an operator's hand upon the cursor, from slew, etc. In addition, the cantilevered structure is not structurally rugged and requires frequent readjustment and maintenance in order to insure the right angle relationship between the Y-axis arm and the X-rail.

Further problems inherent in prior devices include poor mechanical force control. By way of illustration, the electromechanical forces applied in response to computer generated signals for the cursor and/or Y-axis arm to move in a given direction are often retarded by friction or free arm instability. Thus, the precision of digitized input data and the precision of computer generated output are further affected.

Further yet, prior means for inputing data into the digitizer have been subject to human error factors resulting from visual vantage point parallex. Briefly, the physical position from which the operator views a target location for input may affect the digital value assigned to the target since the actual target location may appear at different locations depending on where the operator is standing. This problem not only causes imprecise input but tends to decrease reliability and make repeatability of digitizing and drafting tasks virtually impossible. This is especially true when the vantage point parallex problem is combined with the other problems set out hereinbefore.

It is therefore an object of this invention to provide precise digitizer apparatus not prone to be affected by such problems as the aforementioned slew, force on the cursor, and human error that significantly affect prior digitizer apparatus.

It is a further object to provide a precision digitizer apparatus requiring only infrequent maintenance as compared with the less rugged units known in the prior art.

It is still a further object to provide precision digitizer apparatus can repeat digitizing and drafting tasks in a highly reliable and predictable manner.

SUMMARY OF THE INVENTION

Digitizer apparatus is disclosed wherein great precision is achieved from a combination of factors including inherent rigidness of the structure, built-in mechanical force control, and inclusion of apparatus for the elimination of input vantage point parallex.

The digitizer comprises a drawing table which includes both the working surface and the support for X and Y-axis hardware measuring apparatus. The drawing table, according to the preferred embodiment, has a cabinet type support frame and a flat top which is tiltable between vertical and 45° from the vertical. The support frame is arranged to permit optical projection from the rear with the working surface in the vertical position and to provide "backlighting" at any table angle for work with translucent or transparent material. The working surface provides support for the measuring (scaling) apparatus and the working area.

Still further, according to the preferred embodiment, the working area is situated in and coplanar with, the table top. The surface in this area is glass and it is unobstructed to the rear so that backlighting and optical projection may be viewed from the front. A matt-surfaced translucent material may be placed over the glass surface to serve as a "screen" for optical projection on one hand and a "backlighting diffuser" for work involving a transparent or translucent drawing substrate.

The key as far as precision is concerned is in the construction of the scaling apparatus which, according to the preferred embodiment of the invention, is arranged to make measurements along the X-axis and the Y-axis. To accomplish this, an X-axis track is affixed to the table. The track is comprised of two similar rails, one at the top of the table and one at the bottom. The guiding elements of the tracks are rails of round rod which are precision ground. Also affixed to the X-axis tracks are precision gear racks which, as will be discussed in greater detail hereinafter, are fundamental in providing the rigidity lacking in prior digitizers.

Arranged perpendicularly between and supported and guided by the X-axis tracks is the Y-axis bridge. The Y-axis bridge may travel right and left across the working area. The bridge, according to the preferred embodiments, is a rigid metal structure comprised of: (1) a main frame or body; (2) precision linear antifriction bearings which serve as guides along the X-axis; (3) two rails similar to those of the X-axis; (4) the cursor; (5) two stepper motors; (6) a ball screw to move the courser; and (7) bridge "non-slew" gearing. The stepper motors supply incremental motion for moving the Y-axis bridge along the X-axis and the cursor along the Y-axis. The combination of motion allows positioning of the cursor anywhere in the working area.

Movement along the X-axis is supplied from the X-axis stepper motor to reduction gearing to a shaft connected to pinions (small gears) engaging the racks attached to the X-axis rails mentioned above. Motion along the Y-axis is supplied along the Y-axis stepper through a timing belt to a ball screw to a ball nut attached to the cursor.

The combination pinion-shaft-rack by its arrangement guarantees a fixed 90° relationship or "no-slew" relationship between the Y-axis bridge and the x-rails. Thus, the rigid support for the Y-axis bridge essential for precision digitizing is provided.

It should also be noted that the precision linear antifriction bearings referred to above along with the provision of similar bearings in other portions of the digitizer, to be discussed in detail hereinafter, primarily provide for the force control lacking in prior devices.

The cursor is comprised of a simple mechanical car carrying a "light pointer." The car is in turn comprised of precision linear ball bearings for guiding along the Y-axis rails and the ball nut mentined above. The "light pointer" is an optical system arranged to project the image of a crossline reticle vertically downward onto the working surface and thereby eliminate any input parallex problems.

By virtue of the cursor's moveability on the Y-axis bridge, and the moveability of the bridge along the X-axis rails, the cursor may travel over the entire working area.

Cursor position at any instant is determined by scales (rulers), one on each axis. There are glass scales which are read optically with the information being fed into an electronic counter for immediate display and transmission to a computer. The X-axis scale is mounted on the table top and its position detector mounted on the Y-axis bridge. The Y-axis scale is mounted on the Y-axis bridge with its position detector mounted on the cursor.

The cursor may be moved electrically as directed by a joystick arrangement which permits the cursor to be moved in any direction within the working area and at speeds from some maximum practical amount continuously variable downward to a few thousands of an inch per second.

Thus, the apparatus may be employed in combination to comprise a digitizer which overcomes the problems inherent in the prior digitizers.

The invention features the ability to repeat digitizing and drafting tasks with precision assured.

A further feature of the invention is durable construction of the digitizer apparatus minimizing maintenance costs and tending to assure reliable operation.

A still further feature of the invention is the ability to digitize images optically projected from the rear of the working surface and the ability to digitize transparent or translucent materials.

DETAILED DESCRIPTION

Figure 1:
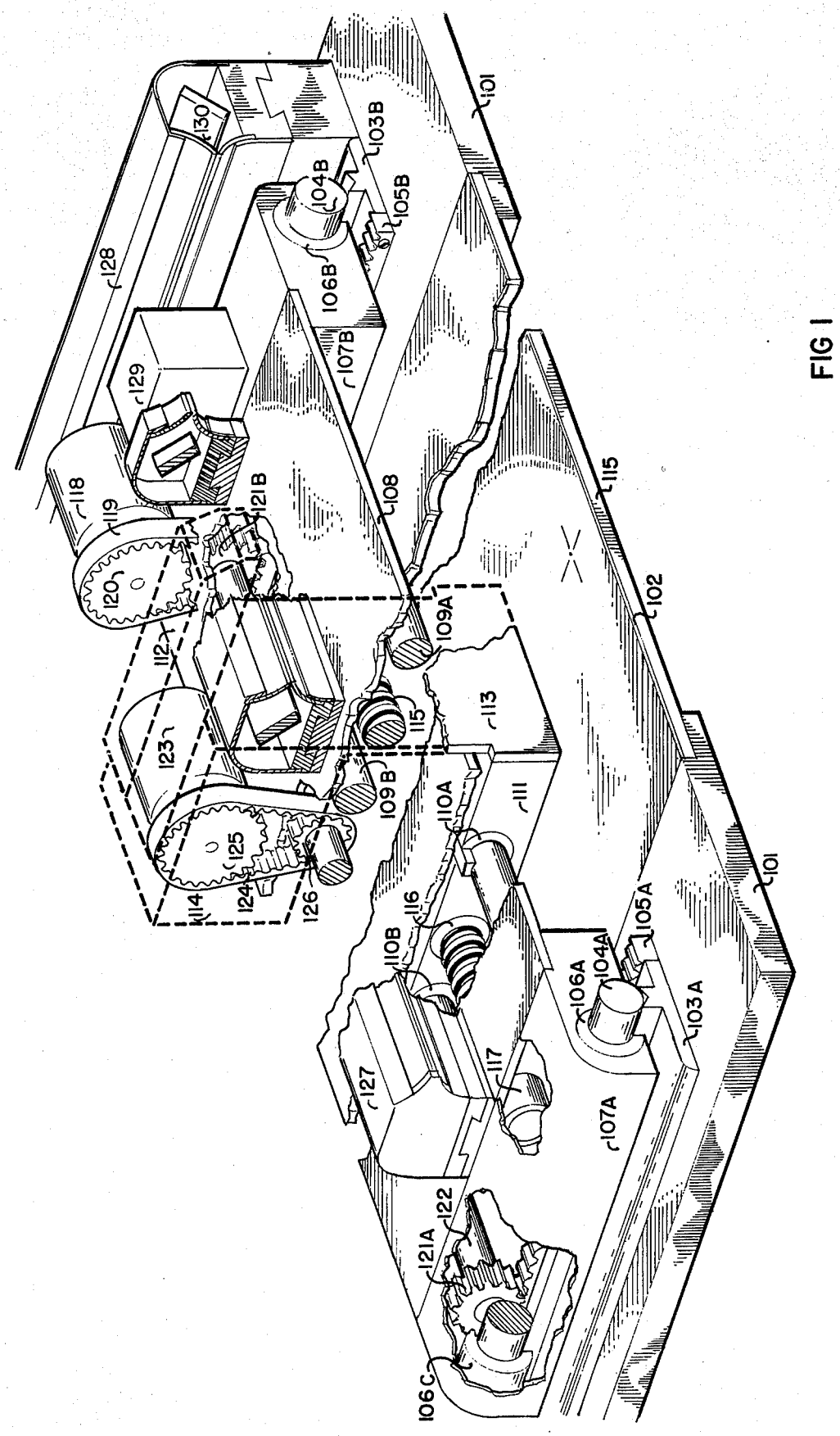
FIG. 1 displays precision digitizer apparatus constructed in accordance with the principles of the invention.

FIG. 1 displays the preferred embodiments of a precision digitizer assembled in accordance with the teachings of the instant invention.

In particular, FIG. 1 depicts support structure 101 upon which is affixed a working surface, shown as unit 102. The working surface is preferably made of glass. Further, FIG. 1 depicts two rail supports, units 103(a) and 103(b), mounted on support structure 101. The rails are shown parallel to each other along what is to be defined herein as the X-axis.

Affixed to rail supports 103(a) and 103(b) are guide rails 104(a) and 104(b), respectively, as well as precision gear racks 105(a) and 105(b), respectively. The precision gear racks comprise a portion of the anti-slew mechanism to be described in greater detail hereinafter.

Linear ball bearings shown as units 106(a), 106(b), and 106(c), serve as antifriction bushings which ride on rails 104(a) and 104(b) and are housed in the end frames of a Y-axis support, said end frame units being depicted as units 107(a) and 107(b).

Next, FIG. 1 displays Y-axis support 108 which is a bridge type structure and which is perpendicular to the X-axis. As indicated above, the Y-axis support (or bridge) 108, is suspended between end frames 107(a), and 107(b).

Two Y-axis rails, shown as units 109(a) and 109(b) in FIG. 1, are affixed to Y-axis bridge 108. Y-rails 109(a) and 109(b) are parallel to one another and perpendicular to X-rails 104(a) and 104(b).

Precision ball bearings 110(a) and 110(b) are installed over Y-rails 109(a) and 109(b) and within the Y-carriage, unit 111. It should be noted than an additional precision linear ball bearing is located in line with bearing 110(a) although not depicted in FIG. 1.

FIG. 1 illustrates a cursor as unit 112 which is affixed to carriage 111. Also attached to Y-bridge 108 is the Y-scale reader support, unit 113. Y-scale reader 114 is directly affixed to support 113. Y-ball screw 115 is shown installed attached to Y-carriage 111. Y-ball screw 115 extends the full length of the Y-distance of travel and is supported at its extreme end by antifriction bearings 117.

A Y-axis stepper motor unit 118 is shown connected to screw 115 by a timing belt 119 and sprocket 120. A companion sprocket is also located on the ball screw.

Two pinions, 121(a) and 121(b) are attached to frames 107(a) and 107(b), respectively, and are engaged in precision racks 105(a) and 105(b), respectively. The pinions are connected by pinion shaft 122 which is driven by X-axis stepper motor 123. Motor 123 is connected to the pinion shaft by timing belt 124 and sprockets 125 and 126.

The Y-scale housing 127 is connected to Y-bridge 108, said scale housing being mounted in such a position as to be readable by Y-scale reader, unit 114. X-scale housing 128 is in the upper portion of the digitizer and is mounted to be readable by X-scale reader 129.

Glass rod 130 is mounted within the X-scale housing and a similar rod exists within the Y-scale housing. These scales are read optically and provide positional information for digital processing and/or readout.

Having described the structure of the digitizer in detail above, the function of the elements and how they cooperate will now be set forth.

Table 101 serves as a means for supporting the entire digitizer apparatus. Supports 103(a) and 103(b) are affixed directly to Table 101 and are utilized to carry guide rails 104(a) and 104(b), respectively. According to the preferred embodiment of the invention, rails 104(a) and 104(b) comprise precision round rod. Supports 103(a) and 103(b) are also precision machined.

Precision racks 105(a) and 105(b) are mounted upon supports 103(a) and 103(b), respectively, so as to provide, in part, the anti-slew feature of the invention. Additionally, the pinion racks serve as a portion of the X-drive.

Rails 104(a) and 104(b) serve as precision guides for bearings 106(a), and 106(b), and 106(c). These bearings help overcome friction and in effect contribute to the force control feature discussed above by allowing freer travel over the rails. These bearings are mounted in end frames 107(a) and 107(b), said end frames serving to rigidly support Y-axis bridge 108.

Y-axis bridge 108 supports Y-axis rails 109(a) and 109(b) and these rails in turn support bearings 110(a) and 110(b) which are installed in carriage 111. These bearings, like bearings 106(a), 106(b), and 106(c), provide low friction guidance for Y-carriage 111 and thereby contribute further to minimizing friction (i.e., force control).

Cursor 112 is used to project a reticle of image (light cross hair) on the point on working area 102 to be digitized. The details of the structure and function of cursor 112 are set out hereinafter with reference to FIG. 2(a) and FIG. 2(b). Y-reader support 113 is, as its name implies, a means for supporting and carrying Y-reader 114.

Units 115, 116, 117, 118, 119, and 120 comprise the Y-axis drive system. These components acting in concert, i.e., motor 118, turning screw 115 via units 119 and 120, through nut 116, enable cursor 112 to be moved up and down along the Y-axis in response to electrical signals applied to motor 118.

Similarly, units 121(a), 121(b), 122, 123, 124, 125, and 126 comprise the X-axis drive system and remainder of the anti-slew system (recall units 105(a) and 105(b) are also part of the anti-slew system). These units, in combination, provide for moving the Y-bridge up and down along the X-axis as will be readily apparent.

The X and Y-axis drive systems, acting in concert, will allow cursor 112 to be placed anywhere on working area 102.

Glass rods in housings 127 and 128 permit positional information to be input to a digital computer or readout device via optical readout techniques. The readout is performed by readers 114 and 129 which provide the electrical output, according to the preferred embodiment, to a digital readout device.

The digital readout device, the scale housings, the glass rods, and readers referred to and itemized above are all available commercially as off the shelf items.

In this instance they were secured from Anilam Electronics Corporation, 5625 N.W. 79th Avenue, Miami, Florida 33166. Ordered for this purpose was 1-2-Axis Anilam Glass Scale System Resolution 0.0005 inch.

Items 104, 105, 106, 109, 110, 115, 116, 117, 118, 119, 120, 121, 123, 124, 125, and 126 are commercially available as off the shelf items and may be used "as they are." Suitable devices for each unit are:

104–109 Thompson hardened and ground rod — 0.750 in diameter

105 — Precision gear rack (PIC) Precision Instruments Corporation

106–110 — Thompson Ball Bushing 0.750 inch diameter

115 — Ball Screw 0.375 diameter Saginaw Corporation

116 — Ball nut 0.375 diameter

117 — Ball Bearing 0.750 O.D. × 0.250 I.D. × 0.250 W New Departure, Inc.

118 — Stepper motor — Sigma Instruments, Inc.

119 — Timing belt — Dodge Corporation

120 — Timing belt pulley — Dodge Corporation

121 — Gear (pinion) (PIC) Precision Instrument Corporation

123 — Stepper motor — Sigma Instruments, Inc.

124 — Timing belt — Dodge Corporation

125 — 126 Timing belt pulleys — Dodge Corporation

Each of units 101, 102, 103, 107, 108, 111, 113, and 122 may be machined from standard machine shop stock as will be readily apparent.

Cursor unit 112, is also comprised of off the shelf items. However, the construction of cursor 112 will be discussed in greater detail hereinafter with reference to FIG. 2(a) and 2(b) to show how the input vantage point parallex problem, referred to herebefore, is solved.

In summary, the apparatus of FIG. 1 provides for the rigid structure required for precision digitizing. Y-axis bridge 108 is made quite stable by double ended supports. Of even more significance, the rack and pinion arrangement for guiding the Y-bridge along a double X-rail provides for exceptional stability which again is translated into precision.

Ball bearing units 106(a), 106(b), 106(c), 110(a), 110(b), and 117, along with those bearings not shown but described, provide for the exceptional force control lacking in prior devices. Friction minimization, in particular, permits forces exerted by the motors to be fully utilized to achieve the accurate cursor positioning desired.

The cursor provides for the elimination of the vantage point parallel problem. In particular, cursor case 112 includes a train of optical components. The first of these components is an illuminator assembly, 201, further comprised of reflector 202, lamp 203, first condenser 204 and second condensor 205. Illumination assembly 201 is available as an off the shelf item from E. Leitz, Inc., Rockleigh, N.J.

Reticle 206 is an opaque disc having four slots and a hole.

Figure 2A:
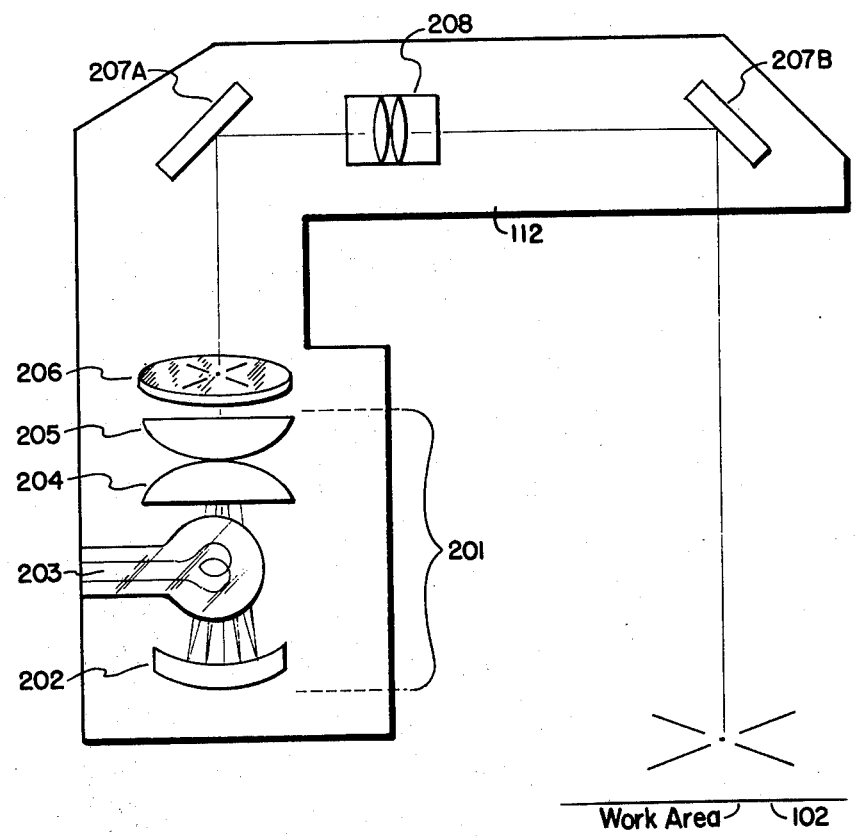
FIG. 2A displays the optical cursor portion of FIG. 1 in greater detail while FIG. 2B displays the reticle of the cursor in detail.

Further depicted as part of the cursor shown in FIG. 2(a) are corner mirrors 207(a) and 207(b) along with projection lens 208.

Figure 2B:
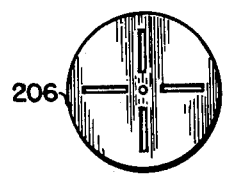

Illumination assembly 201 provides light energy to reticle 206 which masks all but the useful portion of the light, i.e. the desired cross hair image ground onto the reticle face (see FIG. 2(b)). This useful light is projected onto work area 102 (also see FIG. 1) via elements 207(a), 207(b) and 208 via conventional optical projection techniques.

The provision of the cross hair over a given target point eliminates any input vantage point parallex problems, hence, there is not image movement regardless of the vantage point of the operator.

Thus, FIG. 2(a) and FIG. 2(b) displays a device for use as part of the digitizer depicted in FIG. 1, for eliminating the input vantage point problem.

Figure 3:
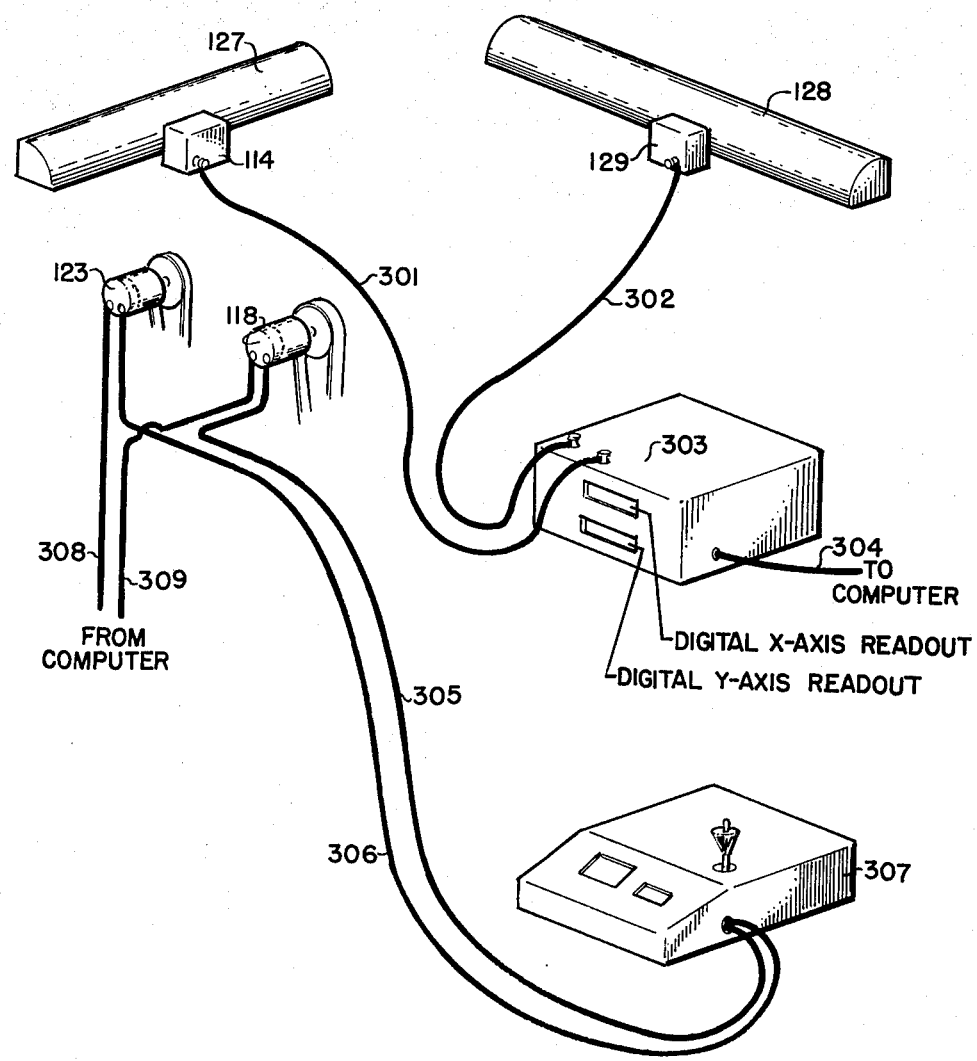
FIG. 3 displays a block diagram of how the apparatus of FIG. 1 interacts with both man and remote computing facilities.

Finally, FIG. 3 depicts the inter-relationship between the digitizer depicted in FIG. 1, man, and an arbitrary, (possibly remote) computation facility.

FIG. 3 shows scale housings 127 and 128 along with readers 114, 129, and motors 118 and 123 and X and Y reader outputs connected to digital readout terminal 303 via links 301 and 302, respectively.

It should be recalled that digital readout terminal 303 is part of the scaling system assembly which is commercially available from Anilam. The commercially available digital readout unit is available with an X and Y readout display for indicating the instantaneous position of the cursor in an arbitrary two dimensional coordinate system. In addition, the terminal is equipped with a keyboard for inputting alphanumeric information into an arbitrary computation system. BCD information from digital readout unit 303 may be input to said arbitrary computation system via link 304.

Motors 118 and 123 may be controlled individually or in combination by joystick arrangement 307 and via links 305 and 306, respectively, or may be controlled directly from an arbitrary digital computation system. Electrical signals from the computer are shown as having access to motors 118 and 123 directly via links 308 and 309, respectively.

The combination of apparatus described in FIG. 3 enables man, via the joystick, to direct cursor movements in an arbitrary two dimensional coordinate system. The digital readout unit also allows man to observe digitally the exact cursor location at any instant and an operator may pinpoint targets for digitizing with great accuracy.

Additionally, FIG. 3 shows the interface between an arbitrary digital computation system and the digitizer. The digital processes that may be formed by such a digital computer are completely optional and constitute no part of the instant invention. Well known programs may be utilized to direct the digitizer to "draw" any desired figure. Generally, all that is required is a simple array structure in the computer for storing coordinate values, an analogue input to the motors for directing the cursor to the coordinate locations stored in said array and a pen attached to said cursor to in effect trace or draw any desired two dimensional figure.

Other interactive components and techniques may obviously be lashed to the digitizer, such as those of the Hart, et al patent which teaches an interactive graphic system for design purposes. For example, cathode ray tube output, light pen modification of the same, etc. (all shown in Hart el al) may be made operative in conjunction with the disclosed precision digitizer apparatus by well known input-output techniques not constituting any part of the instant invention.

It will be understood that the precision digitizer apparatus described herein gives the designer or engineer a creative and analytical power heretofore unrealizable with conventional digitizers. While the apparatus has been described with reference to its specific hardware, it is to be understood that this description is illustrative in nature and that the invention is to be limited only by the scope and spirit of the appended claims.

I claim:

1. Precision digitizer apparatus for digitizing the coordinate values of an arbitrary target point on a work surface area comprising, in combination:
   a. a support structure, including said work surface area;
   b. a first pair of rail supports affixed adjacent to said work surface and onto said support structure, positioned parallel to one another along a first axis;
   c. a first pair of rails, mounted upon said first pair of rail supports;
   d. bridge support means, including force control means and a cursor, comprising
      a pair of end housings, housing said force control means;
      an axis bridge, perpendicular to said first axis and supported by said end housings for carrying said cursor,
      a second pair of rails supported by said axis bridge, each of the rails of said second pair being adjacent to one another and perpendicular to said first axis,
   e. anti-slew means, affixed to said first pair of rail supports, upon which the said bridge support means is mounted, for both preventing slew of the bridge support means and for allowing said bridge support means to be driven along a first axis;
   f. first drive means, connected to said bridge support means for allowing said cursor to be driven along a second axis, said second axis being perpendicular to said first axis, and along said bridge support means; and
   g. scale assembly means for outputting the instantaneous position of said cursor, and thereby resulting in enabling the target point over which said cursor is located to be digitized.

* * * * *